(No Model.)  2 Sheets—Sheet 1.

A. J. HOPKINS.
CHURN.

No. 560,995.  Patented May 26, 1896.

Witnesses:
E. Callan Duffy
Hubert E. Peck

Inventor
A. J. Hopkins
per O. E. Duffy
Attorney (No Model.) 2 Sheets—Sheet 2.

A. J. HOPKINS.
CHURN.

No. 560,995. Patented May 26, 1896.

Witnesses
E. Callan Duffy
Hubert E. Peck

Inventor
A. J. Hopkins
per J. E. Duffy
Attorney

UNITED STATES PATENT OFFICE.

ANDREW J. HOPKINS, OF BEAVER FALLS, PENNSYLVANIA.

CHURN.

SPECIFICATION forming part of Letters Patent No. 560,995, dated May 26, 1896.

Application filed June 20, 1895. Serial No. 553,383. (No model.)

*To all whom it may concern:*

Be it known that I, ANDREW J. HOPKINS, of Beaver Falls, in the county of Beaver and State of Pennsylvania, have invented certain new and useful Improvements in Churns; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in churns.

The object of the invention is to provide an improved churn simple and effective in construction and composed of a minimum number of parts to accomplish the ends desired.

A further object of the invention is to provide an improved churn comprising a hollow rotary dasher formed to draw the milk longitudinally therethrough and to quickly and thoroughly extract the butter therefrom and so formed that the butter can be easily and quickly removed therefrom.

A further object of the invention is to provide improvements in details of construction and arrangements of parts whereby a highly-efficient and improved churn will be produced.

The invention consists in certain novel features of construction and in combinations and arrangements of parts more fully and particularly pointed out and described hereinafter.

Figure 1:
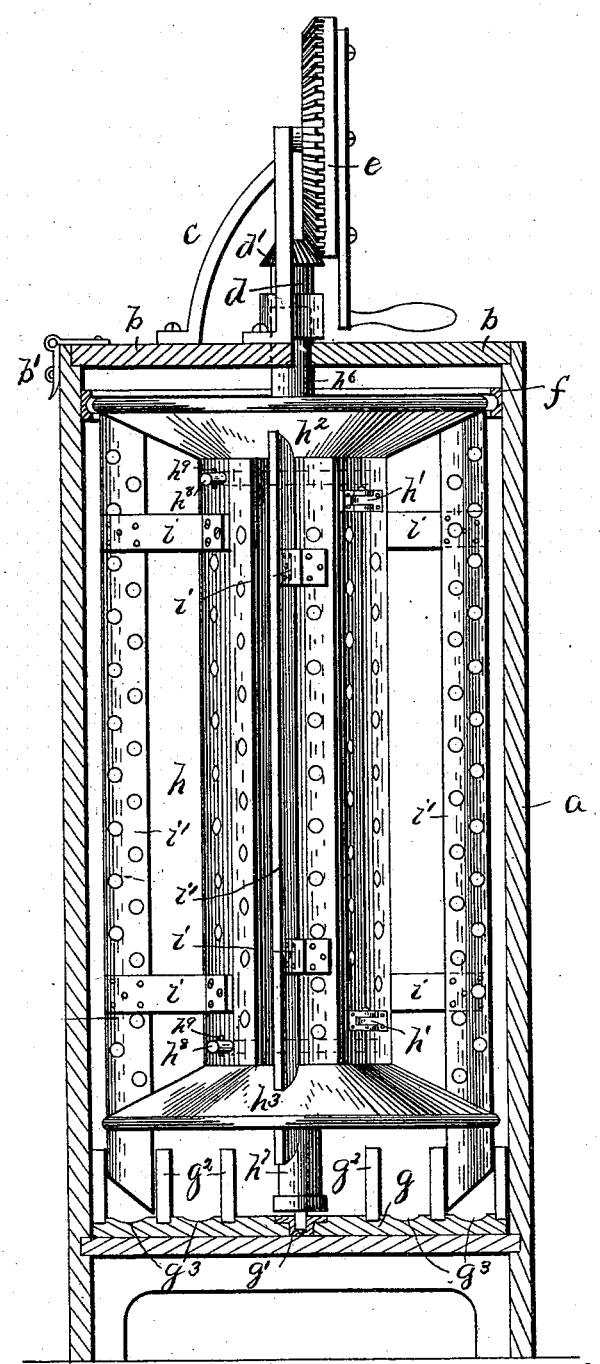
Figure 2:
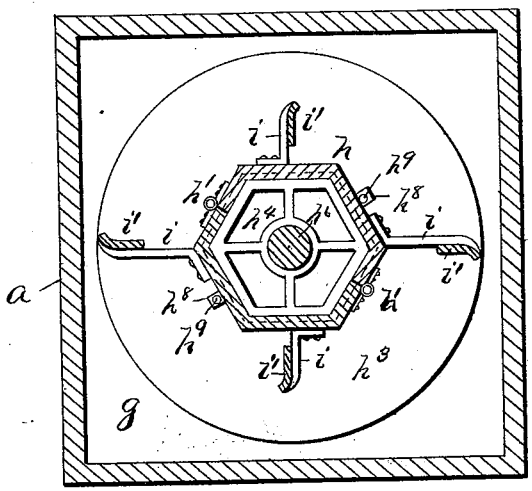
Figure 3:
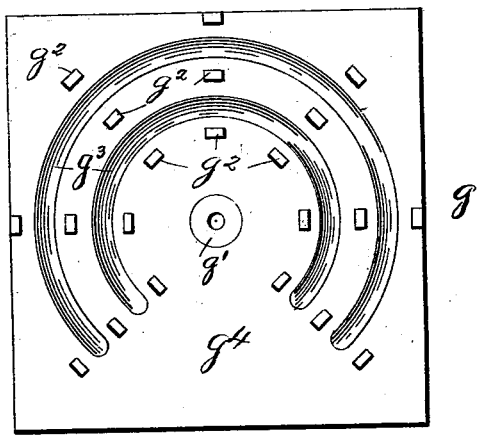

Referring to the accompanying drawings, Figure 1 is a longitudinal vertical section through the casing, showing the dasher in elevation. Fig. 2 is a top plan with the cover of the casing removed. Fig. 3 is a top plan of the removable bottom plate.

In the drawings, $a$ is the vertical casing, angular, usually square, in cross-section. The upper edge of the casing can be recessed at its inner edge to receive the cover $b$, formed in two sections meeting at the longitudinal center of the casing. Suitable fastenings $b'$ are employed to removably secure the cover-sections to the casing. One section of the cover has the upright frame $c$, having the short vertical shaft $d$, journaled in the lower part thereof and formed with a bottom socket to removably receive the upper end of the dasher-shaft. This shaft also has the bevel-pinion $d'$ formed thereon. $e$ is a vertical drive-wheel journaled in said frame and meshing with said pinion and provided with a turning-handle. By reason of the location of this exceedingly simple and effective gearing on one section of the cover the cover can be easily removed with the gearing, leaving the dasher free to be separately removed from the casing, if so desired.

$f$ is an inwardly-projecting ledge or shoulder in the casing at or near the upper end thereof, forming a circular opening by filling up the corners, so that the diameter of the circular opening is about equal to the shortest diameter of the square interior of the casing.

$g$ is a removable bottom plate in the casing, having the step or bearing $g'$ for the lower journal of the dasher. This plate on its upper surface has the circularly and concentrically arranged series of vertical angular breaker pins or projections $g^2$, with the concentric furrows or grooves $g^3$ in its upper face between the breakers. A radial space $g^4$ is left on the face of the plate without the breakers for the grooves and extending from the central portion of the plate within the circles of breakers and grooves outwardly to the space around the breakers and grooves to permit free passage of the milk and butter globules to the central portion of the plate, as hereinafter set forth.

The dasher is formed of a hollow body $h$, longitudinally arranged in the casing and preferably provided with sharp angles and flat faces by being formed angular in cross-section, although I do not wish to limit myself to the employment of a hollow dasher formed angular in cross-section. This hollow dasher preferably has the perforated side walls and open ends and is usually formed in two longitudinal similar sections removably clamped together by suitable means, as hooks and eyes $h'$, somewhat as shown. This hollow dasher is provided with the circular end heads $h^2$ $h^3$, open at the centers into the ends of the hollow dasher and flaring outwardly therefrom, so that their greatest diameters are slightly less than the shortest diameter of the casing interior. The upper funnel-shaped head $h^2$ flares upwardly from the dasher end with its outer edge arranged within and a short distance from the internal ledge or flange $f$, forming the circular opening in the casing for said upper head $h^2$. The lower funnel-shaped head $h^3$ is arranged directly over and a short distance above the bottom breakers. The heads are formed integral with the central inner spider-frames formed to fit within the dasher, respectively. The upper head is formed integral with the short shaft $h^6$, projecting upwardly from its spider $h^4$, with the angular upper end to fit removably in the socket of the driving-gear and thereby impart rotation to the dasher. The lower head has a corresponding central shaft $h^7$ formed therewith and projecting downwardly, with the lower journal removably fitting in the bottom step. Each head has radial perforated lugs $h^8$, extending from its edge to pass through corresponding openings in the dasher, and are secured by pins $h^9$, passed through the lugs at the outer side of the dasher. The heads are thus removably secured in the dasher and the sections of the dasher are more rigidly secured together by such fastening.

The hollow dasher is preferably, although not necessarily, provided with exterior radial arms $i\ i$, to the outer ends of which the vertical wings $i'$ are secured. These wings are preferably perforated and concaved and extend from the upper head down to the lower head, with extensions beneath the lower head traveling between the concentric series of breakers beneath the lower head. Four wings are shown arranged in two pairs traveling in inner and outer concentric circular paths, the inner pair of wings traveling over the inner furrow or channel in the bottom plate and the other pair of wings over the outer channel and between the outer series of breakers.

The hollow dasher can be easily lifted from the casing and its sections separated and its two heads removed, so that the butter can be removed from all parts and all parts can be thoroughly cleaned. The bottom plate can be easily removed and all parts thoroughly cleansed.

In operation when the proper quantity of milk or cream has been placed in the churn and the dasher rapidly rotated the body of milk is caused to whirl or rotate, so that a vortex is formed and the milk is drawn longitudinally through the hollow dasher and in the opposite direction at the exterior of the dasher. The lower funnel-shaped head causes the milk to flow between the breakers, while the wings passing between the breakers cause a great agitation and breaking up of the milk at this point. The wires and flat faces and angles of the dasher also exert a pounding and breaking effect on the milk and throw it against the flat faces of the casing, so that the milk is quickly and thoroughly broken up and the butter globules separated therefrom. When the dasher stops, the butter is drawn up into the hollow dasher and collects in the top funnel or hopper shaped head thereof, where it can be easily collected and removed. The open space on the bottom plate permits the butter and buttermilk to readily pass up into the dasher assisted by the lower funnel-head when the dasher stops.

This churn is exceedingly quick and thorough in separating the butter and collects the same when the operation is completed.

It is evident that various slight changes might be made in the forms, constructions, and arrangements of the parts described without departing from the spirit and scope of my invention. Hence I do not wish to limit myself to the exact constructions herein set forth, but consider myself entitled to all such changes as fall within the spirit and scope of my invention.

Having thus fully described my invention, what I claim, and desire to secure by Letters Patent of the United States, is—

1. In a churn, the combination of a casing, the vertical hollow open and perforated dasher arranged vertically entirely within and approximately throughout the length of the casing, an enlarged funnel-shaped head on the lower end of said dasher slightly less in diameter than the internal width of the casing, the upwardly-flaring funnel-shaped head on the upper end of said dasher a distance below the top of the casing, and slightly less in diameter than the width of the casing, a ledge around said upper head to force the milk up through the dasher, and means for mounting and operating the dasher, substantially as described.

2. In a churn, the combination, of a vertical casing angular in cross-section, the bottom having the circular series of breaker-pins with intervening furrows, and the radial channel through said pins and furrows to the space within the center thereof to permit the milk and butter to flow readily to said center, the vertical hollow perforated dasher having the oppositely-flaring funnel-shaped heads within the casing, the projections from the lower head between said series of pins, and the exterior vertical wings between the heads, said dasher angular in cross-section, substantially as described.

3. The combination of a casing, a removable hollow perforated dasher entirely therein formed in separate longitudinal sections, the flaring end heads removably fitted and locking in the ends of the dasher, and securing said sections together, each head provided with a spider having a central shaft, substantially as described.

In testimony that I claim the foregoing as my own I affix my signature in presence of two witnesses.

ANDREW J. HOPKINS. [L. S.]

Witnesses:
ALMOND R. LEYDA,
JOSEPH C. ROUZER.